US006223603B1

(12) United States Patent
McKinnon

(10) Patent No.: US 6,223,603 B1
(45) Date of Patent: May 1, 2001

(54) CAPACITIVE PRESSURE TRANSDUCER HAVING REDUCED OUTPUT ERROR

(75) Inventor: E. Martin McKinnon, Jamaica Plain, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,059

(22) Filed: May 18, 1999

(51) Int. Cl.$^7$ ........................................................ G01L 9/12
(52) U.S. Cl. ................................................................ 73/718
(58) Field of Search ............................... 73/718, 724, 706, 73/756, 1.57, 37; 361/283.1, 283.3, 283.4

(56) References Cited

U.S. PATENT DOCUMENTS

| 4,716,492 | 12/1987 | Charboneau et al. .................. 73/718 |
| 4,875,135 | 10/1989 | Bishop et al. ......................... 73/718 |

OTHER PUBLICATIONS

Copending application Ser. No. 09/067,162 filed Apr. 27, 1998 Entitled "Capacitive Pressure Transducer Having Reduced Output Error"—Inventor(s): Dales R. Sogge, Mitchell H. Berkson.

*Primary Examiner*—William Oen
(74) *Attorney, Agent, or Firm*—Russell E. Baumann; Frederick J. Telecky, Jr.

(57) ABSTRACT

A fluid pressure sensor (10) includes a capacitive pressure sensing element (12) having a thin, relatively flexible ceramic diaphragm (14) mounted in closely spaced apart relation to a rigid ceramic substrate (16) by a glass annulus (18) mounted in a housing (28) having a port (28a) for fluid whose pressure is to be sensed by being received on an outer face (12a) of the diaphragm. An electronic circuit (36) is mounted in a chamber (20a) formed between a connector (20) and an outer face (12b) of the substrate. An electrically conductive coating (14b) is placed on the outer face (12a) of the diaphragm and an annular electrically conductive gasket (30) is disposed between the diaphragm and the bottom floor (28c) of the housing surrounding a fluid inlet (28a) in order to effect an electrical path between the conductive layer on the diaphragm and the housing. An O-ring (32) of polymer compatible with the fluid being sensed is disposed within the annulus of the conductive gasket to serve as a fluid barrier in selected applications. In other applications, particularly those in which the pressure of the sensed fluid is low, the conductive gasket serves both as an electrically conductive member and as a fluid seal with the O-ring being eliminated.

8 Claims, 1 Drawing Sheet

CAPACITIVE PRESSURE TRANSDUCER HAVING REDUCED OUTPUT ERROR

FIELD OF THE INVENTION

This invention relates generally to fluid pressure sensors and more particularly to capacitive pressure transducers having reduced output error.

BACKGROUND OF THE INVENTION

A known pressure sensor, as shown in U.S. Pat. No. 4,716,492, the subject matter of which is included herein by this reference, comprises a capacitive pressure sensing element having a thin, relatively flexible ceramic diaphragm mounted in closely spaced, sealed, overlying relation to a rigid ceramic substrate. Metal coatings are deposited on respective opposing surfaces of the diaphragm and substrate to serve as source and detect capacitor plates which are arranged in predetermined closely spaced relation to each other to form a capacitor. Electrically conductive traces extend from the capacitor plates out to pins received in bores formed through the substrate located between the capacitor plates and the outer periphery of the diaphragm and substrate which are connected to an electronic conditioning module attached to the transducer. The diaphragm flexes in response to pressure and causes the source and detect plates to move closer together thereby increasing the capacitance between the plates which is measured by the electronic conditioning module. An annular guard ring of electrically conductive material is printed on the substrate around the detect plate and electrically held at the same voltage as the detect plate. This ring serves as a guard to reduce the electrical field intensity between the source and detect plates at the edges of the detect plate. These fringe electric fields are undesirable because they cause a non-linear pressure transducer output. The electronic conditioning module is designed to measure the capacitance between the source and detect plates only and is insensitive to capacitance between the source plate and the guard, between the detect plate and the guard or between either the source plate or the detect plate and the housing of the sensor.

When used with polar or conductive fluids it has been found that the transducer output shifts by up to 1% full span or more. In view of the fact that the pressure transducers are used to monitor the pressure of many fluids including those which are polar or conductive, such as water, this error is undesirable.

One proposed solution is to place a thin discrete metal shield on the diaphragm connected to the transducer housing through brass wool or similar electrically conductive material. The conductive shield covering the diaphragm and connected to the housing would act as a guard for the entire transducer, that is, the electric fields would not pass through the conductive shield and, therefore, could not be affected by material on the opposite side of the shield. However, this approach is unsatisfactory for several reasons including the possibility of pieces of the wool deteriorating and contaminating the fluid, the effect of pressure from the compliant wool on the transducer output, the durability of the metal shield and questions of compatibility with various working fluids, possible hysteresis due to the metal shield and the question of long term durability of the electrical contact between the shield and the housing.

Another proposed solution is the use of a metal shield printed on the surface of the diaphragm using, for example, the same material, e.g., gold, which is used for the electrically conductive capacitor plates and traces. The printed shield would be connected to the metallic housing using a compliant mechanism such as a washer and a wave spring. However, this approach involves the addition of components which add to the cost of the sensor as well as causing problems relating to pinching and damaging an adjacent O-ring used as a fluid seal.

In copending application Ser. No. 09/067,162, assigned to the assignee of the present invention, an improved guard plate arrangement is shown and described comprising a source guard plate which surrounds the source plate, source trace and source pin aperture on the diaphragm and a detect guard plate which surrounds the detect plate, detect trace and detect pin aperture on the substrate in order to prevent pressure transducer output errors due to the presence of polar or conductive fluids. However, while this approach is effective in many applications, in certain other applications, particularly low pressure applications in which the diaphragm is relatively thin, output error continues to be higher than desired.

Yet another approach, which involves the provision of a conductive shield, e.g., gold layer, on the surface of the diaphragm as described above, employs a conductive wire which is bonded to the diaphragm and connected to a ground trace on a flexible circuit which mounts the electronic conditioning module within the housing. The ground trace on the flexible circuit is in turn connected to the housing. Although this approach is effective in shorting the parasitic coupling field lines to ground through the housing for diaphragms of any thickness, each unit requires hand assembly making it costly as well as fraught with risk of damage during handling and unsuitable for production in large quantities. It would be desirable to provide a sensor in which the output error is minimized or eliminated without appreciably impacting the cost of the sensor.

SUMMARY OF THE INVENTION

It is an object of the present invention to provide a capacitive fluid pressure transducer having an improved error free output when used with polar or conductive fluids free of the above noted limitations. Another object of the invention is the provision of a capacitive pressure transducer having an improved error free output when used with polar or conductive fluids which is economical to manufacture yet reliable and of relatively low cost.

Briefly described, the novel and improved pressure transducer of the invention comprises a variable capacitive pressure sensing element having a rigid ceramic substrate having a face surface and a thin, relatively flexible ceramic diaphragm having a face surface mounted in aligned, spaced apart relation with the face surfaces facing each other. Metal coatings are provided on the opposing face surfaces to form capacitor plates. The sensing element is mounted in a metallic housing having a fluid inlet and a fluid receiving chamber with the diaphragm exposed to the fluid chamber. Changes in pressure of fluid in the chamber causes flexing of the diaphragm and concomitant changes in spacing between the capacitor plates. The face surface of the diaphragm exposed to the fluid chamber is coated with an electrically conductive layer such as gold. An electrically conductive, physically compliant, annular gasket is received between the diaphragm and the bottom floor of the housing which defines the fluid chamber and is compressed against the bottom floor and sidewall to form an electrically conductive path between the conductive layer on the diaphragm and the housing as well as a fluid seal of the fluid chamber. In relatively high pressure applications, e.g., above 50 psi, and in other applications in which the sensed fluids are not compatible with the material of the conductive gasket, an inner O-ring of suitable material to serve as a fluid seal is placed within the annular gasket. In relatively low pressure applications, e.g., below 50 psi, the conductive gasket can also serve as a fluid seal without using the additional O-ring.

Figure 1:
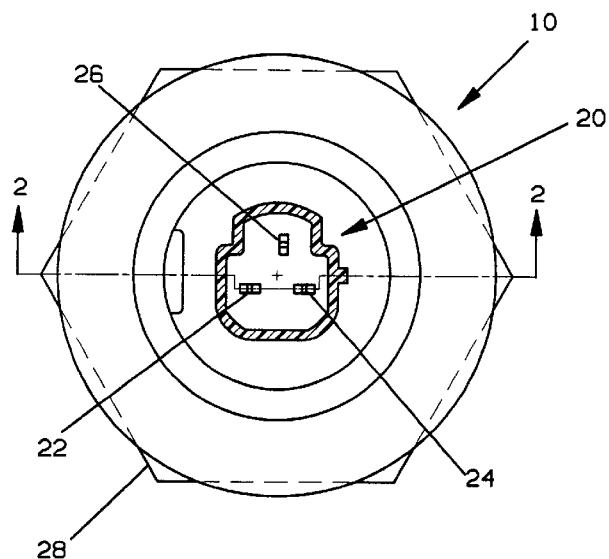
FIG. 1 is a top plan view of a capacitive pressure transducer made in accordance with the invention.
Figure 2:
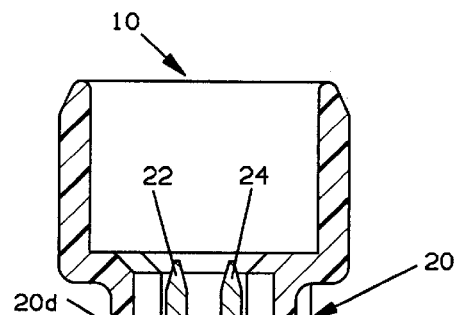
FIG. 2 is a cross-sectional view taken on line 2—2 of FIG. 1.

Dimensions of certain of the parts may be exaggerated in the drawings for the purpose of illustration.

DESCRIPTION OF THE PREFERRED EMBODIMENTS

Referring to the drawings, numeral 10 indicates the novel pressure sensor of the invention which includes a fluid pressure responsive capacitive sensing element 12, preferably formed of a flat cylindrical disc having one surface 12a to be exposed to an applied fluid pressure and having an opposite side 12b. Preferably the sensing element comprises a thin, relatively flexible diaphragm 14 of a ceramic material such as alumina or the like mounted in closely spaced, sealed, overlying relation to a ceramic substrate 16 of a similar material by an annular glass sealant 18 to be movable relative to the substrate in response to changes in the applied pressure. Metal coatings 12c, 12d (FIG. 3) are provided on opposing first face surfaces 14a, 16a of the diaphragm and substrate, respectively, to serve as capacitor plates arranged in closed spaced, overlying relation to form a capacitor having a capacitance which varies with the applied pressure. Suitable pin terminals (not shown) extend from the capacitor plates through bores formed in the substrate and in sealed relation therewith so that a distal end of the pins are disposed above surface 12b of the transducer.

Sensor 10 further includes a connector body 20 of an electrically insulating material such as a glass reinforced polymer which is disposed in overlying relation to surface 12b of the transducer to form a circuit chamber 20a therebetween. Preferably, the connector body is cup-shaped having a bottom portion with a sidewall 20b and a flange 20c extending around the sidewall, and has a plurality of connector terminals 22, 24, 26 extending from the chamber through a bottom floor into a shroud portion 20d. The connector body is disposed with the free end of the sidewall 20c in facing relation to surface 12b of the transducer for forming circuit chamber 20a. A housing 28 has a port 28a for exposing the sensing element surface 12a to an applied pressure which communicates with a cavity formed by sidewall 28b of the housing through a bottom floor 28c. Transducer 12 and the flange 20c of connector body 20 are received in the cavity with sensing element surface 12a maintained in spaced apart relation with bottom floor 28c to form a fluid chamber 28e by a physically compliant, electrically conductive gasket 30. In high pressure applications, e.g., above 50 psi, as well as in applications in which the sensed fluid is incompatible with the material of conductive gasket 30, an O-ring 32 of suitable material such as Neoprene, is placed within the annulus of gasket 30 to serve as a fluid seal preventing the sensed fluid from contacting gasket 30. The free end portion 28d of sidewall 28b is deformed by swaging or the like over flange 20c with a selected amount of force on gasket 30 and O-ring 32 for clamping the connector body and sensing element together. Sealant 34 may be injected in the annular space between the free end portion 28d of sidewall 28b and the connector body 20 to provide an environmental seal.

Sensor 10 further includes an electric circuit 36 disposed in chamber 20a electrically connected to the sensing element and connector terminals for providing an electrical signal corresponding to the pressure applied to the capacitive sensing element of the type shown and described in U.S. Pat. No. 4,875,135, the subject matter of which is included herein by this reference.

Figure 3:
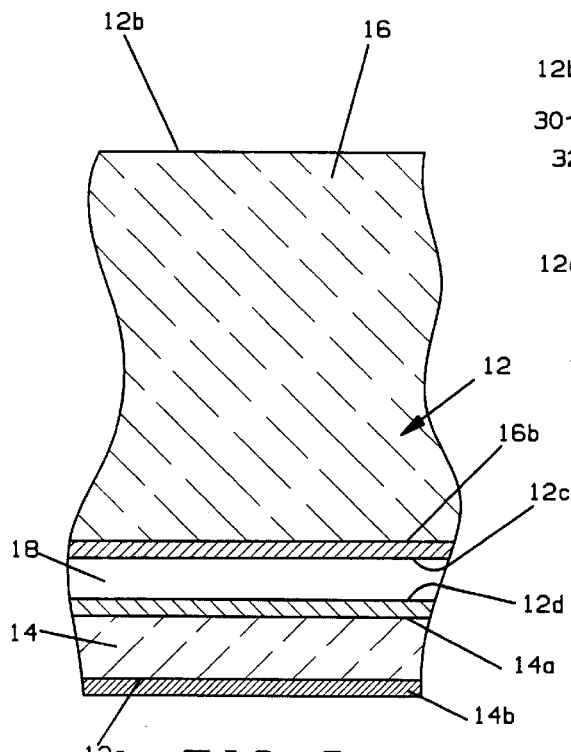
FIG. 3 is an enlarged, cross-sectional view of a broken away portion of transducer 12 shown in FIG. 2.

With reference to FIG. 3, diaphragm 14 of sensing element 12 is provided with a coating 14b of electrically conductive material, such as gold, on the outer face surface thereof, i.e., sensing element surface 12a, the surface to be exposed to an applied fluid pressure. Gasket 30, as stated supra, is formed of physically compliant, electrically conductive material, such as a polymer loaded with nickel carbon particles and has a durometer value within approximately 55–85 Shore A. Examples of suitable material for conductive gasket 30 include silicone loaded with nickel carbon particles having a maximum durometer value of 65 Shore A, fluorosilicone loaded with nickel carbon particles having a maximum durometer value of 75 Shore A and ethylene propylene loaded with nickel carbon particles having a maximum durometer of 85 Shore A. Selection of material for conductive gasket 30 is based on the particular fluid being sensed as well as its sensed pressure range. In low pressure applications, i.e., in applications of lower than approximately 50 psi, where the diaphragm is especially thin and more susceptible to being loaded by the presence of an inner O-ring which would cause an output error, the conductive gasket can be used by itself to provide the desired electrically conductive path to the housing as well as a fluid seal. Loaded ethylene propylene has been found to be efficacious in such applications where the sensed fluid, such as water or steam, are compatible with ethylene propylene. Loaded fluorocarbon can be used with sensed fluids such as glycol, oil and gasoline. In applications in which the sensed pressure is above approximately 50 psi, the use of O-ring 32 of Neoprene or other material inert to most sensed fluids, is preferred and allows using loaded silicone, a less expensive conductive material, for conductive gasket 30.

In order to ensure that effective electrical engagement is obtained between gold coating 14b and housing 28 under a specified range of temperature conditions, gasket 30 is deformed at least approximately 10% of its thickness, i.e., with respect to the vertical spacing between transducer 12 and bottom floor 28c. Housing 28 is formed of suitable electrically conductive material, such as brass. Parasitic capacitive coupling caused by pressure sensing of conductive or polar fluids by the transducer are effectively shorted by the electrical connection between gold coating 14b and housing 28 which serves as a ground. Remaining capacitive coupling is constant and can be eliminated by calibration during manufacture.

Use of conductive gasket 30 results in an improved capacitive pressure transducer essentially eliminating output error. The transducer made in accordance with the invention is easily assembled and with essentially no extra labor required compared to prior art pressure transducers.

It should be understood that although particular embodiments of the invention have been described by way of illustrating the invention, the invention includes all modifications and equivalents thereof falling within the scope of the appended claims.

What is claimed:

1. A pressure transducer comprising a housing formed of electrically conductive material, the housing having a bottom floor and sidewalls extending therefrom up to a free distal portion forming a cavity, a capacitive sensing element having a diaphragm with a face surface received in the cavity with the face surface facing the bottom floor, the face surface having thereon a layer of electrically conductive material essentially co-extensive with the face surface, an annular gasket of physically compliant, electrically conductive polymer material, disposed between the bottom floor and the conductive layer defining an annular periphery, the free distal portion of the sidewall of the housing being crimped over to apply a selected force on the annular gasket and a fluid inlet formed in the housing through the bottom floor within the annular periphery whereby parasitic capacitive coupling caused by certain fluids received through the fluid inlet will be shorted from the conductive layer through the annular gasket to the housing.

2. A pressure transducer according to claim 1 in which the layer of electrically conductive material is gold.

3. A pressure transducer according to claim 1 in which the annular gasket is composed of ethylene propylene loaded with electrically conductive particles.

4. A pressure transducer according to claim 1 in which the annular gasket is composed of silicone loaded with electrically conductive particles.

5. A pressure transducer according to claim 1 in which the annular gasket is composed of fluorosilicone loaded with electrically conductive particles.

6. A pressure transducer according to claim 1 in which the annular gasket has a durometer level in the range of approximately 55–85 Shore A.

7. A pressure transducer according to claim 6 in which the annular gasket has an at rest thickness and the selected force on the annular gasket is sufficient to compress the gasket at least approximately 10% of its at rest thickness.

8. A pressure transducer according to claim 1 further comprising an O-ring formed of flexible polymer material different from the polymer material of the annular gasket, the O-ring being disposed within the annular periphery of the annular gasket.

* * * * *